United States Patent
Cinotti

(10) Patent No.: US 10,699,816 B2
(45) Date of Patent: Jun. 30, 2020

(54) NUCLEAR REACTOR, IN PARTICULAR LIQUID-METAL-COOLED COMPACT NUCLEAR REACTOR

(71) Applicant: HYDROMINE NUCLEAR ENERGY S.A.R.L., Luxembourg (LU)

(72) Inventor: Luciano Cinotti, Recco (IT)

(73) Assignee: HYDROMINE NUCLEAR ENERGY S.A.R.L., Luxembourg (LU)

( * ) Notice: Subject to any disclaimer, the term of this patent is extended or adjusted under 35 U.S.C. 154(b) by 0 days.

(21) Appl. No.: 15/558,309

(22) PCT Filed: Mar. 17, 2016

(86) PCT No.: PCT/IB2016/051503
§ 371 (c)(1),
(2) Date: Sep. 14, 2017

(87) PCT Pub. No.: WO2016/147139
PCT Pub. Date: Sep. 22, 2016

(65) Prior Publication Data
US 2018/0061513 A1  Mar. 1, 2018

(30) Foreign Application Priority Data
Mar. 19, 2015 (IT) ............... GE2015A0036

(51) Int. Cl.
*G21C 1/03* (2006.01)
*G21C 15/14* (2006.01)
(Continued)

(52) U.S. Cl.
CPC ............ *G21C 15/14* (2013.01); *G21C 1/03* (2013.01); *G21C 1/32* (2013.01); *G21C 5/02* (2013.01);
(Continued)

(58) Field of Classification Search
CPC ........ G21C 15/14; G21C 15/06; G21C 15/22; G21C 15/28; G21C 1/03; G21C 1/32; G21C 5/02; G21C 5/28
See application file for complete search history.

(56) References Cited

U.S. PATENT DOCUMENTS 5,178,821 A * 1/1993 Gluntz ............... G21C 15/18
376/282
5,737,379 A * 4/1998 Erbes .................. G21C 13/02
376/302
(Continued)

FOREIGN PATENT DOCUMENTS

DE 4432705 7/1995
EP 0308691 3/1989
(Continued)

OTHER PUBLICATIONS

Encyclopedia Britannica. Pressurized-Water Reactor page. Nuclear Energy. 2012. https://www.britannica.com/technology/pressurized-water-reactor.*

(Continued)

*Primary Examiner* — Lily C Garner
(74) *Attorney, Agent, or Firm* — Dorsey & Whitney LLP

(57) ABSTRACT

The present invention relates to a nuclear reactor (1), in particular a liquid-metal-cooled reactor, provided with a separation structure (5) between hot header (6) and cold header (7), narrower in the upper portion (16) for containment of the headers of the fuel assemblies and wider in the lower element (14) at the active part (4) of the core, with a variously shaped connecting element (15) between the lower element (14) and the upper element (16), and with heat exchangers (11) positioned between the upper portion (16) of said separation structure (5) and the reactor vessel (2), which engage on the connecting element (15) via vertical ducts (20) for being fed with hot primary fluid leaving the core (4).

14 Claims, 2 Drawing Sheets

(51) Int. Cl.
*G21C 1/32* (2006.01)
*G21C 5/02* (2006.01)
*G21C 15/06* (2006.01)
*G21C 15/22* (2006.01)
*G21C 15/28* (2006.01)

(52) U.S. Cl.
CPC .............. *G21C 15/06* (2013.01); *G21C 15/22* (2013.01); *G21C 15/28* (2013.01); *Y02E 30/34* (2013.01); *Y02E 30/35* (2013.01)

(56) References Cited

U.S. PATENT DOCUMENTS

| | | | | |
|---|---|---|---|---|
| 8,418,532 | B2* | 4/2013 | Nam | F16L 9/18 |
| | | | | 122/459 |
| 2008/0310575 | A1 | 12/2008 | Cinotti | |
| 2010/0290579 | A1* | 11/2010 | Cinotti | G21C 1/03 |
| | | | | 376/403 |
| 2013/0266111 | A1 | 10/2013 | Young | |

FOREIGN PATENT DOCUMENTS

| | | |
|---|---|---|
| FR | 2150255 | 4/1973 |
| FR | 2995123 | 3/2014 |
| JP | 1977066188 | 6/1977 |
| JP | 1978006797 | 1/1978 |
| JP | H06174871 | 6/1994 |

OTHER PUBLICATIONS

Italian Application MI2001A001752 English Translation and Drawings.
Italian application MI2007A001685 English Translation and Drawings.
International Search Report and Written Opinion for International Application No. PCT/IB2016/051503 dated Jun. 21, 2016.

* cited by examiner

NUCLEAR REACTOR, IN PARTICULAR LIQUID-METAL-COOLED COMPACT NUCLEAR REACTOR

TECHNICAL FIELD

The present invention relates to a nuclear reactor, in particular a compact liquid-metal-cooled nuclear reactor, equipped with one of more primary heat exchangers.

In particular, the present invention relates to a reactor where the primary heat exchangers, in which the heat produced in the core is transferred from a primary fluid (liquid metal) to a secondary fluid (water), are installed inside the main reactor vessel that also houses the core, namely in the volume that, with the components of the reactor contained therein, is called "primary system". A hydraulic separation structure containing the core internally delimits a volume called the hot header and a volume on the outside called the cold header.

BACKGROUND ART

Italian Patent Applications No. MI2005A001752 and No. MI2007A001685 show a reactor of this type, wherein a substantially cylindrical separation structure delimits a central hot header and an annular cold header, which surrounds the hot header; the cold header houses a plurality of integrated heat-exchange units, each of which includes a pump and one or two heat exchangers; each integrated unit has an inlet connected to the hot header through specially provided ducts for the primary fluid.

However, these solutions, like others generically similar with heat exchangers of different configuration, are not devoid of drawbacks, especially in terms of dimensions, in particular due to the complexity of the canalization system of the primary fluid and inadequate utilization of the spaces. The pump-exchanger units must be housed outside the separation structure between the hot header and cold header, but said structure has a relatively large diameter because it contains the core and usually the neutron shielding elements of the structure. The pump-exchanger units are thus installed in a circumferential position with respect to the centre of the reactor, with a consequent increase in the diameter of the reactor vessel, which contains all the components of the primary system.

Documents US2013/266111, EP0308691 and JPH06174871 usefully have a separation structure of smaller diameter in the upper part and larger diameter in the lower part. In these solutions, the refrigerant fluid exiting from the core rises inside the separation structure to its upper edge, where the direction reverses to top-down feed the heat exchanger units. Similarly, these solutions are not without drawbacks, such as the constructional complexity of the zone of fluid direction reversal and the risk of entraining blanket gas that, in the case where the refrigerant fluid is a liquid metal, could cause accidental positive reactivity insertions in the core.

DISCLOSURE OF INVENTION

The object of the present invention is to provide a nuclear reactor, in particular a liquid-metal-cooled nuclear reactor, which overcomes the indicated drawbacks of known solutions and has both constructional and safety advantages.

The present invention thus concerns a nuclear reactor, in particular a liquid-metal-cooled nuclear reactor, as defined in the appended claim 1, and, for its auxiliary characteristics and plant configurations, in the dependent claims.

BRIEF DESCRIPTION OF THE DRAWINGS

The invention is described in the following non-limitative example of embodiment, with reference to the figures in the accompanying drawings, in which.

BEST MODE FOR CARRYING OUT THE INVENTION

Figure 1:
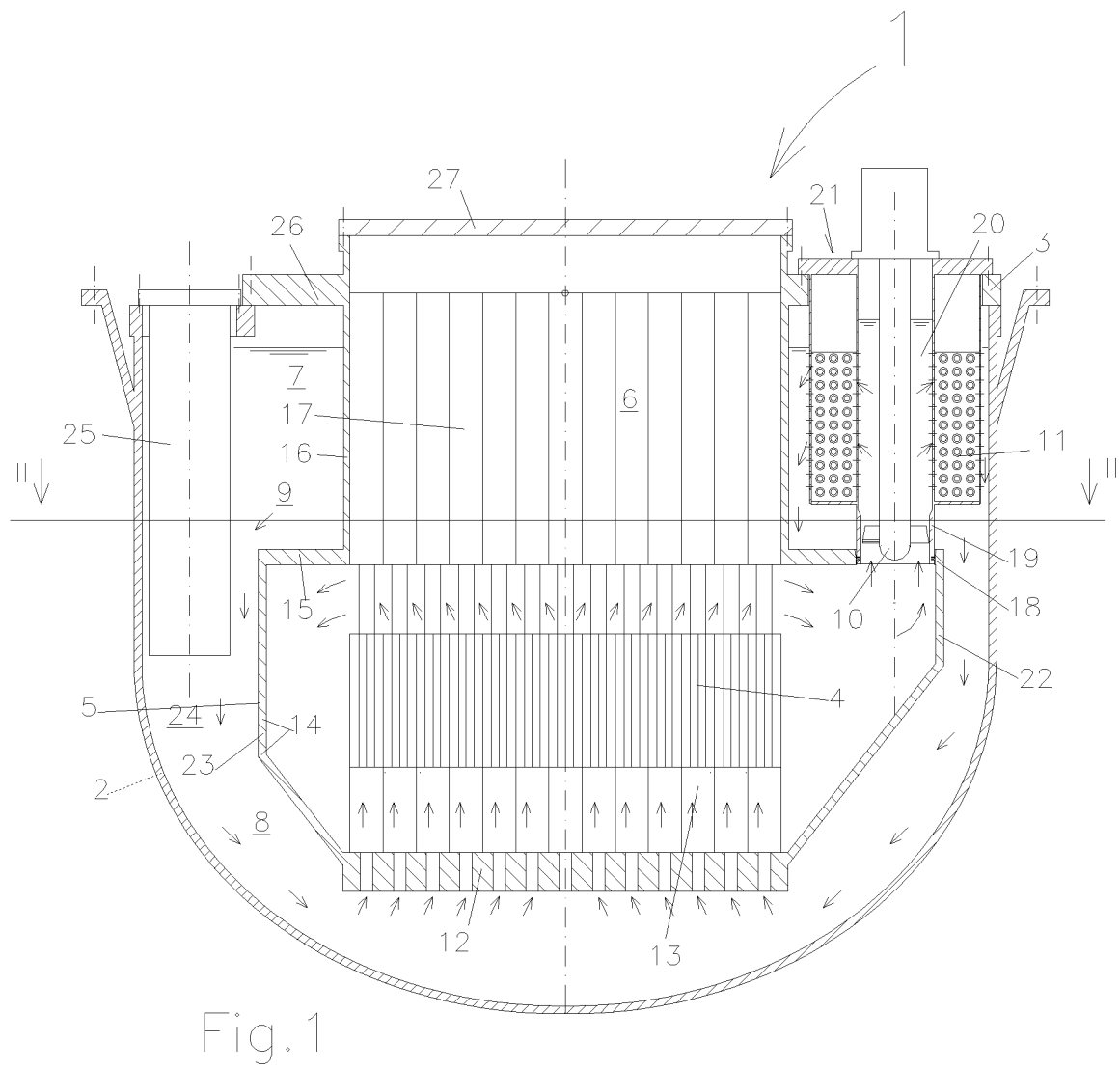
FIG. 1 is a schematic longitudinal section view of a nuclear reactor according to the invention, with a plurality of pumps and heat exchangers.
Figure 2:
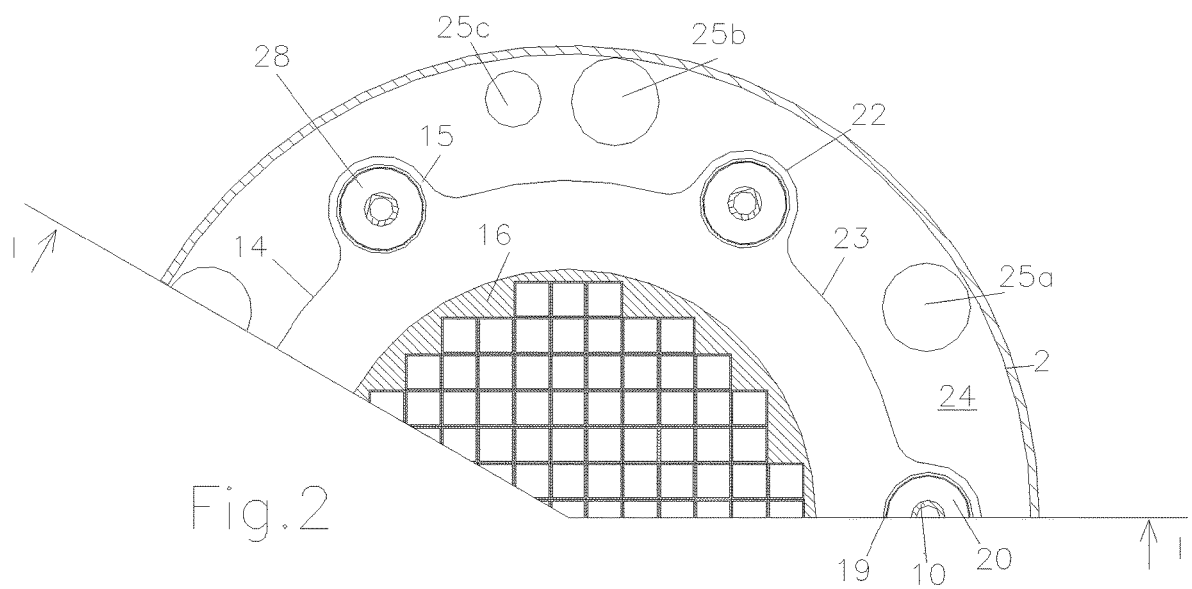
FIG. 2 is a partial schematic cross-sectional view of the reactor in FIG. 1 in the plane II-II.
Figure 3:
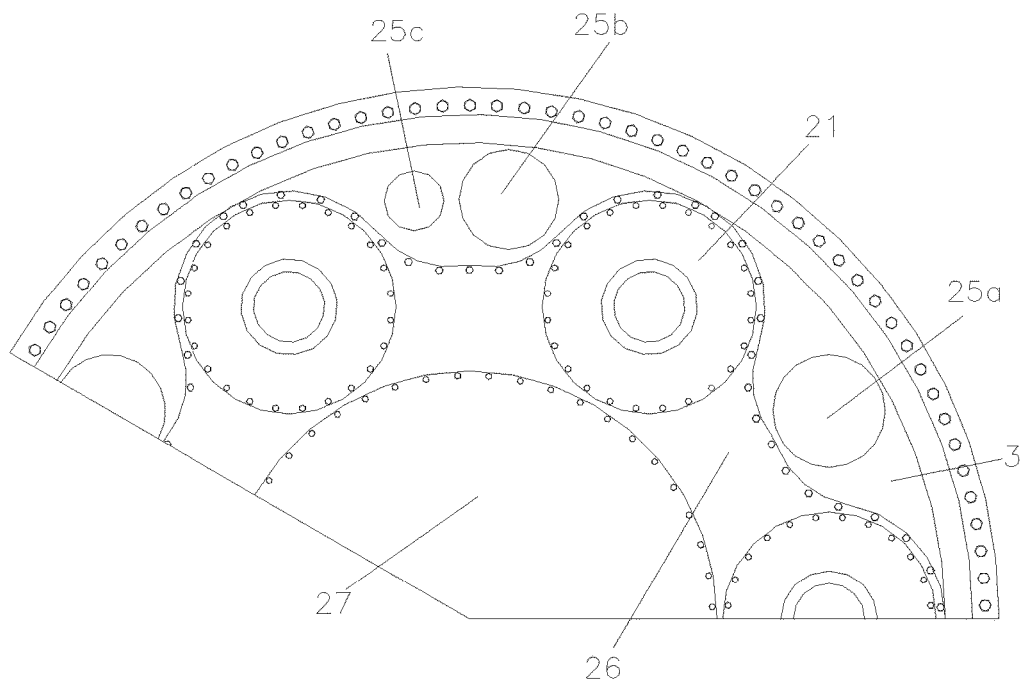
FIG. 3 is a partial plan view of the reactor in FIG. 1.

Referring to FIGS. 1-2-3, a nuclear reactor 1 comprises a main reactor vessel 2 covered by a roof 3 and internally containing a core 4 and a hydraulic separation structure 5, with a substantially amphora-like shape, delimiting a hot header 6 and a cold header 7 in which a primary cooling fluid 8 of the core 4 circulates. The cold header 7 is defined by a region 9 included between the reactor vessel 2 and the separation structure 5 and is therefore arranged around the hot header 6.

The reactor vessel 2 houses pumps 10 and heat exchangers 11 through which the primary fluid 8 runs and which transfer the power generated in the core 4 to a secondary fluid circulating in an external secondary circuit (known and not shown).

Preferably, the primary fluid 8 is a liquid metal and, in particular, a heavy liquid metal, for example lead or a lead-bismuth eutectic, while the secondary fluid is water (which vaporizes during the heat exchange with the primary fluid), and therefore the heat exchangers 11 are steam generators. A blanket gas is present above the primary fluid 8 in the reactor vessel 2.

Various auxiliary devices are housed inside the separation structure 5, including support structures for instrumentation and control rods, not described for simplicity as they are known and not pertinent to the present invention.

The separation structure 5 comprises a grid 12, of known design, supporting the fuel elements 13, a lower element 14 for hydraulic containment of the core 4 and opportunely shaped and starting at a certain radial distance from the active part of the core to reduce neutron damage of the structure to acceptable limits, and a connecting element 15 having different possible shapes, for example conical or plate-like, between the lower element 14 and an upper element 16.

In this solution, the neutron shielding function is accomplished by the liquid metal interposed between element 14 and the outer ring of fuel elements 13, while the rings of shielding elements, usually placed between core and separation structure in known solutions, are reduced in number or totally eliminated.

Element 16 is substantially cylindrical on the outside and of variable thickness, with an internal profile modelled to contain and radially constrain the remaining shielding elements, or in the case where they are totally eliminated, the outer ring of fuel elements in their inactive upper portion 17. This results in element 16 having a smaller radial extension with respect to element 14.

The heat exchangers 11 are arranged entirely within the cold header 7 and are circumferentially spaced around the cylindrical upper portion 16 of the separation structure 5. Each pump-exchanger unit 21 engages on the connecting element 15; suitable sealing devices 18 (known and not shown for simplicity) are provided between the connecting element 15 and the cylindrical elements 19 integral with the heat exchangers 11 and which delimit the ducts 20 that feed the pump-exchanger units 21 with the hot primary fluid 8 leaving the core. In consequence, the volume inside element 16 is substantially stagnant, without fluid-induced vibration risks for the core's instrumentation and control systems contained therein.

Except for the portion perforated for engagement of the cylindrical elements 19, element 14 and element 15 can be axisymmetric or, as indicated in FIGS. 1-2, advantageously have portions 22 more radially extended near the ducts 20 and portions 23 less radially extended to leave wider volumes 24 for the cold header 7 between said portions 23 and the reactor vessel 2 for the installation of other components, generically indicated as 25a, 25b and 25c, such as heat exchangers of residual-power evacuation systems and components of purging and pre-heating systems for the liquid metal, which are not shown because they are known solutions not forming part of the present invention. In the connecting element 15, said more radially extended portions 22 may appear in plan view (FIG. 2) as lobes circumferentially spaced apart at a predetermined distance from one another.

The separation structure 5 can be appropriately supported according to known solutions in the lower part of the reactor vessel or in the upper part of the reactor's roof.

A solution is shown in FIGS. 1 and 3 where the separation structure 5 is supported from the reactor's roof 3 by the cover 26. The pump-exchanger units also rest against the cover 26. A further cover 27 covers the hot header 6 and is removable to carry out fuel replacement operations.

The advantages of the present invention clearly emerge from the foregoing description:

The primary circuit of the reactor is a compact system.

The rings of shielding elements of the separation structure 5 are reduced in number or completely eliminated, with advantages in economy and mechanical strength of the core's radial constraints.

The elimination of the rings of shielding elements reduces the number of components to replace, simplifying the maintenance operations to be carried out and reducing reactor downtime.

The radial positioning of the heat exchangers is not limited by the maximum size of the separation structure 5, but only by its element 16, which has a smaller diameter.

The feed of the heat exchangers does not need a duct departing radially from the separation structure and is not performed from above the element 16, as contemplated in known solutions, but is performed vertically via a sealed device 18 between the cylindrical element 19 of the duct 20 that feeds the pump-exchanger unit 21 and the connecting element 15.

The lobed shape of the lower element 14 and of the connecting element 15 of the separation structure 5 leave wide free volumes 24 between the less radially extended portions 23 of the lower element 14 and the connecting element 15 with respect to the reactor vessel 2 for the installation of more auxiliary components 25 of the reactor.

The lobed shape of the lower element 14 and of the connecting element 15 of the separation structure 5 and the corresponding lobed shape of the cover 26 enable replacing the separation structure 5 without removing the reactor's auxiliary components 25.

Finally, it is understood that numerous modifications and variants can be made regarding the reactor described and illustrated herein without departing from the scope of the appended claims.

The invention claimed is:

1. A liquid-metal-cooled nuclear reactor, comprising:
a reactor vessel;
a core having an active part;
a hot header above the core and in which a primary fluid circulates for cooling the core, the primary fluid being a liquid metal;
fuel assemblies;
a separation structure supporting the fuel assemblies;
a cold header surrounding the hot header and in which the primary fluid circulates for cooling the core, the colder header separated from the hot header by the separation structure;
at least one heat exchanger configured to remove heat from the primary fluid via a secondary fluid;
wherein the separation structure has a substantially amphora-like shape and includes:
a lower element placed around the core at a certain radial distance from the active part of the core such that the liquid metal interposed between the lower element and the active part of the core provides a neutron shielding function that reduces neutron damage of the separation structure to predetermined acceptable limits; and
an upper element located above the core, the upper element having a reduced radial extent with respect to the lower element, and being joined to the lower element by a connecting element;
wherein the connecting element is equipped with penetrations from which vertical ducts extend to connect to one or more heat exchangers positioned between the upper element of the separation structure and the reactor vessel, for feeding the at least one heat exchanger with hot primary fluid leaving the core;
wherein the connecting element and the upper element of the separation structure constitute a radial constraint of an inactive upper part of the fuel assemblies of the core.

2. The reactor according to claim 1, wherein the connecting element between the lower element and the upper element of the separation structure includes a plate.

3. The reactor according to claim 1 wherein:
the connecting element includes radially extending lobes, the penetrations being positioned on the radially extending lobes; and
the vertical ducts for feeding the at least one heat exchanger engage the penetrations positioned on radially extending lobes.

4. The reactor according to claim 3, further comprising one or more free volumes for installation of one or more auxiliary components of the reactor, each of the free volumes being positioned between portions of the connecting element without the radially extending lobes and the reactor vessel, and also between portions the amorpha-like shape of the separation structure and the reactor vessel.

5. The reactor according to claim 1, wherein the primary fluid contained within the upper element of the separation structure is substantially stagnant.

6. The reactor according to claim 1, wherein the secondary fluid includes water brought to steam in the at least one heat exchanger that is a steam generator.

7. The reactor according to claim 6, wherein the liquid metal includes a heavy liquid metal.

8. The reactor according to claim 7, wherein the heavy liquid metal includes lead.

9. The reactor according to claim 1, wherein the lower element acts as an element of hydraulic containment of the core.

10. The reactor according to claim 1, wherein the at least one heat exchanger, includes a steam generator.

11. The reactor according to claim 1 wherein the upper element having the reduced radial extent with respect to the lower element is generally cylindrical.

12. The reactor according to claim 1 wherein the connecting element extends outwardly between the upper element to the lower element.

13. The reactor according the claim 12, wherein the connecting element extends generally perpendicular from the upper element to the lower element.

14. The reactor according to claim 12 wherein the connecting element is generally horizontal and the vertical ducts extend vertically directly from the connecting element.

\* \* \* \* \*